United States Patent [19]
Hashimoto et al.

[11] Patent Number: 5,193,159
[45] Date of Patent: Mar. 9, 1993

[54] MICROPROCESSOR SYSTEM

[75] Inventors: Kouzi Hashimoto, Mitaka; Atsushi Hasegawa, Koganei; Ikuya Kawasaki, Kodaira; Kazuhiko Iwasaki, Hachiohji, all of Japan

[73] Assignees: Hitachi, Ltd., Tokyo; Hitachi Microcomputer Engineering, Ltd., Kodaira, both of Japan

[21] Appl. No.: 709,783

[22] Filed: Jun. 3, 1991

Related U.S. Application Data

[63] Continuation of Ser. No. 100,757, Sep. 24, 1987, abandoned.

[30] Foreign Application Priority Data

Sep. 24, 1986 [JP] Japan .................. 61-223587

[51] Int. Cl.⁵ .................................. G06F 15/16
[52] U.S. Cl. ........................ 395/375; 364/DIG. 1; 364/228.6
[58] Field of Search ............... 364/DIG. 1 MS File, 364/DIG. 7 MS File; 395/800, 200, 100, 275, 325, 650

[56] References Cited

U.S. PATENT DOCUMENTS

| | | | |
|---|---|---|---|
| 3,930,235 | 12/1975 | Kubus et al. | 364/200 |
| 4,115,866 | 9/1978 | Janssens et al. | 364/900 |
| 4,149,242 | 4/1979 | Pirz | 364/200 |
| 4,270,167 | 5/1981 | Koehler et al. | 364/200 |
| 4,338,675 | 7/1982 | Palmer et al. | 364/748 |
| 4,547,849 | 10/1985 | Louie et al. | 364/200 |
| 4,574,350 | 3/1986 | Starr | 364/200 |
| 4,598,356 | 7/1986 | Dean et al. | 364/200 |
| 4,847,756 | 7/1989 | Ito et al. | 364/200 |

FOREIGN PATENT DOCUMENTS

| | | |
|---|---|---|
| 0021365 | 1/1981 | European Pat. Off. |
| 0139254 | 5/1985 | European Pat. Off. |

OTHER PUBLICATIONS

WESCON 86/Conference Record, vol. 30, Nov. 18, 1986, pp. 35/1-1-13.
WESCON Conference Record, vol. 24, Sep. 16, 1980, pp. 23/3-1-8.
IBM Technical Disclosure Bulletin, vol. 22, No. 6, Nov. 1979, pp. 2415-2416.

*Primary Examiner*—Robert B. Harrell
*Attorney, Agent, or Firm*—Antonelli, Terry, Stout & Kraus

[57] ABSTRACT

When a coprocessor communicates a plurality of data items with a master processor and a memory according to a bus access cycle activated by the master processor, the coprocessor is supplied therein with information indicating a data storage position as a data transfer source or destination. The master processor and coprocessor independently monitor the number of the sequence of data transfers or the end of the sequence of data transfer operations. As a consequence, when executing a sequence of plural data transfer operations, the coprocessor need not receive a command from the master processor for each data transfer thereto. Further, it is not required for the coprocessor to indicate the end of the sequence of data transfer cycles to the master processor since the master processor can determine this on its own.

35 Claims, 6 Drawing Sheets

MICROPROCESSOR SYSTEM

This application is a continuation of application Ser. No. 100,757, filed on Sept. 24, 1987, now abandoned.

BACKGROUND OF THE INVENTION

The present invention relates to a microprocessor system, and in particular, to data transfer control therein, for example, to a technology effectively applicable to control of data transfer between a plurality of registers included in a coprocessor and an external storage device.

A coprocessor is connected to a master processor such as a general-purpose data processor to enable a register set and an instruction set to be expanded, thereby adding a new processing capability to the processor.

There has been a method for effecting an interface between the master processor and the coprocessor in which the coprocessor monitors the instruction execution state of the master processor by use of a status signal. When an instruction for the coprocessor is detected, the instruction is caused to be executed by the coprocessor, and if a bus access is necessary at the execution of the instruction, the coprocessor operates as a local bus master in place of the master processor so as to generate a bus access cycle. In addition, according to another method of interfacing between the master processor and the coprocessor, the main processor is operated to detect an instruction for the coprocessor and to execute all bus cycles for a transfer of a command for the coprocessor and for a transfer of data between the memory and the coprocessor. The published reference in which the coprocessor is described include "LSI Handbook". The OHM-Sha, Ltd., Nov. 30, 1984, pp. 558-559 and "Microcomputer Handbook". The OHM-Sha, Ltd., Dec. 25, 1986, pp. 680-681.

The present invention results from investigation of a case where the coprocessor effects transfer of a plurality of data items to and from the master processor and the memory in a system as described above in which the master processor executes the bus access cycle for the coprocessor, for example, including an operation to send an address signal to the memory. According to the conclusion of the investigation, since the system has a characteristic that the master processor generates and controls the bus access cycle, and the coprocessor, on the other hand, achieves a transfer of actual data, in a case where only the master processor recognizes and controls a sequence of data transfers, it has been found that a command must be issued to the coprocessor for each data transfer and that the efficiency of a sequence of data transfers is reduced because of the increase in the number of commands issued. For the same reason, in a case where only the master processor recognizes and controls a sequence of data transfers, the master processor cannot recognize by itself whether or not the necessary transfer cycle has been finished, and hence the master processor must obtain information indicating the end of a sequence of data transfer cycles from the coprocessor. In this situation, it has been found that the transfer of the information is undesirably delayed in a local signal line and a data input/output buffer, that the initiation of the subsequent operation to be executed after the sequence of data transfers is delayed, and that the operation efficiency of the overall system is, therefore, lowered.

SUMMARY OF THE INVENTION

It is, therefore, an object of the present invention to provide a system in a computer system in which the master processor controls the bus access cycle for the coprocessor for improving the efficiency of a data transfer associated with the coprocessor.

More particularly, when the coprocessor effects a sequence of transfers of plural data items to and from the master processor and the memory according to the bus access cycle initiated by the master processor, the coprocessor is provided with information indicating a data storage location which is a data transfer source or a data transfer destination. Furthermore, the master processor and the coprocessor independently monitor the transfer operations to detect the end of the sequence of data transfer operations. In this processing, the information necessary for the bus access cycle initiated by the master processor can be contained in a data transfer instruction; moreover, the information included in the data transfer instruction can be supplied as a data transfer command to the coprocessor. In this case, the end of the sequence of data transfer operations independently monitored by the master processor and the coprocessor can be identified according to the field information indicating a plurality of data storage locations in the coprocessor, said field information being included in the data transfer instruction and the data transfer command.

As a consequence, when executing a sequence of plural data transfer operations, the coprocessor need not receive the command from the master processor each time a data item is transferred; moreover, the coprocessor need not notify the master processor of the end of the sequence of data transfer cycles. Consequently, in a case where the processor generates and controls the bus access cycle on one hand, and the coprocessor effects the actual data communication on the other hand, the system operates to prevent the condition that leads to the minimization of the data transfer efficiency due to the increase in the number of commands issued, which may occur when only the master processor recognizes and controls the sequence of data transfers. In addition, the system further operates to prevent the situation that the supply of the end indication of the sequence of data transfer cycles to the master processor is undesirably delayed, which may take place only when only the coprocessor recognizes and controls the sequence of data transfers. As a result, improvement of the efficiency of the sequence of data transfers is realized; furthermore, the next operation necessary to be executed after the data transfer operation can be immediately initiated, thereby achieving an improvement in the operation efficiency of the overall system.

BRIEF DESCRIPTION OF THE DRAWINGS

The present invention will be apparent from the following detailed description taken in conjunction with the accompanying drawings in which.

DESCRIPTION OF THE PREFERRED EMBODIMENT

Figure 1:
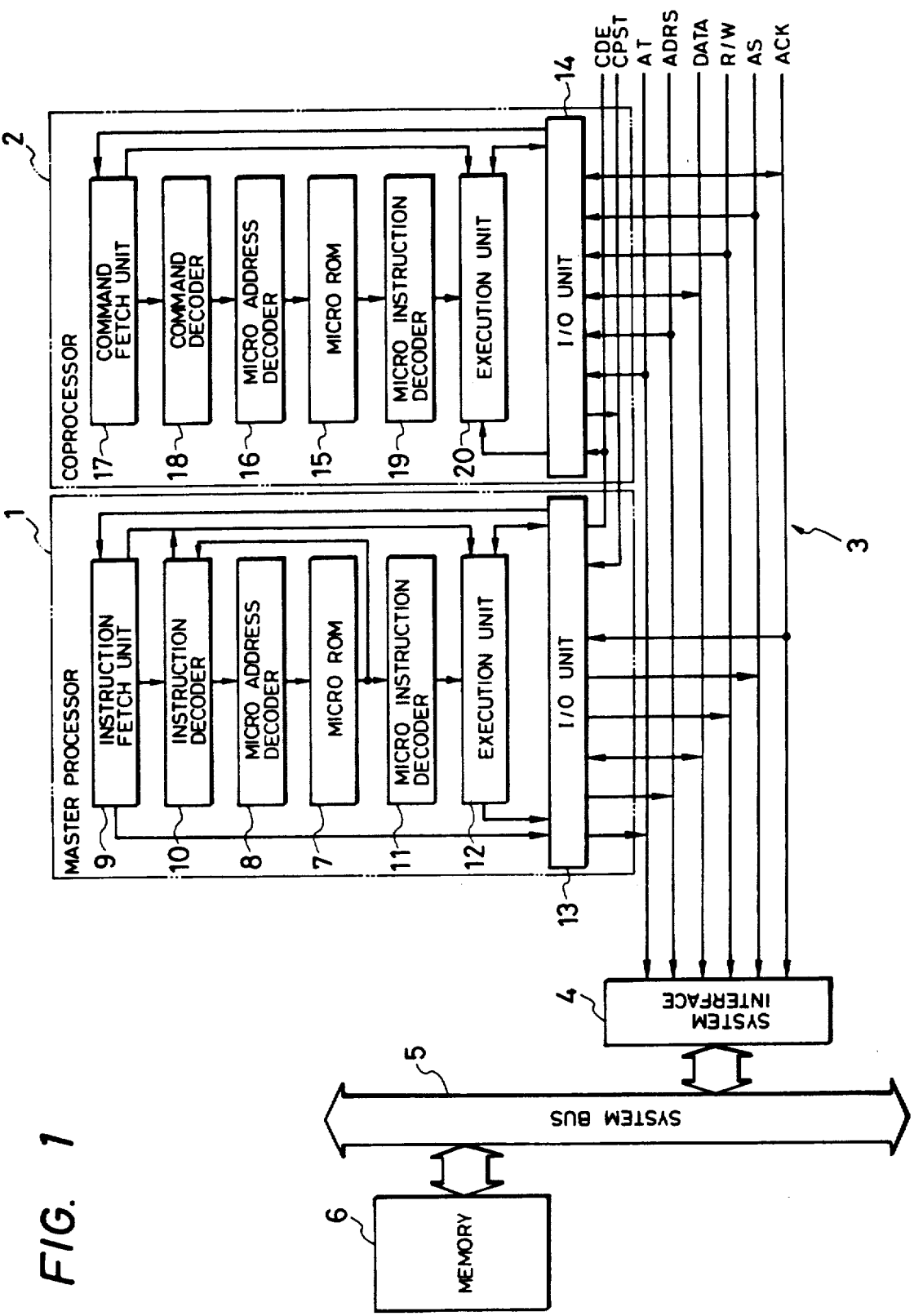
FIG. 1 is a schematic block diagram illustrating an embodiment of the microprocessor system according to the present invention.

The microprocessor system of FIG. 1 includes a master processor 1, such as a general purpose processor, and a coprocessor 2 closely linked thereto by means of a local bus 3, the coprocessor 2 having functions including floating operations, multiprecision operations of a transcendental function, and so forth. The local bus 3 is linked via a system interface 4 to a system bus 5. In FIG. 1, the system is representatively linked to a memory 6, which may be provided as a random access memory (RAM).

A macro instruction, such as a machine language instruction, supplied from the system side is fetched by the master processor 1. In a case where the fetched instruction is a coprocessor instruction, the master processor 1 separates therefrom fields necessary for the coprocessor 2 to generate a command and then supplies the command to the coprocessor 2. The master processor 1 controls all bus cycles at a transfer of a command to the coprocessor 2, a data transfer between the memory 6 and the coprocessor 2, and so forth.

The master processor 1 is provided with a micro ROM 7 in which microprograms are stored. The micro ROM 7 is accessed from the micro address decoder 8, which causes micro instructions constituting the microprograms to be sequentially read.

In FIG. 1, reference numeral 9 indicates an instruction fetch unit including a FIFO register (not shown) used to prefetch a macro instruction according to a pipeline processing operation or an instruction prefetch control operation. The micro address decoder 8 is supplied with an address signal obtained by decoding in an instruction decoder 10 an operation code of the macro instruction fetched into the instruction fetch unit 9. The micro address decoder 8 decodes the address signal to read from the micro ROM 7 the first micro instruction among a sequence of micro instructions to execute the macro instruction. The micro instruction thus read is supplied to the micro instruction decoder 11 and is decoded therein. As a result, the micro instruction decoder 11 supplies control signals necessary for the execution of the instruction to the execution unit 12.

Each of the second and subsequent micro instructions included in the series of micro instructions corresponding to the macro instruction is indicated when the code of the next address field of the micro instruction previously read is supplied to the instruction decoder 10. The instruction decoder 10 includes a multiplexer (not shown) effecting for an output a selection between a macro instruction and a code of the next address field included in a micro instruction. Consequently, based on the code of the next address field thus sequentially selected by the multiplexor, micro instructions are sequentially read from the micro ROM 7. Operations of the execution unit 12 and the like are controlled according to a predetermined order based on the micro instruction thus read and the control signals corresponding thereto.

Through the operations described above, a macro instruction, such as a transfer instruction or an arithmetic instruction, is executed. The master processor 1 is linked to the local bus via an input/output unit 13.

The coprocessor 2 is linked via an input/output unit 14 to the local bus 3. The coprocessor 2 is provided with a micro ROM 15 in which microprograms are stored. The micro ROM 15 is accessed from the micro address decoder 16, which causes the micro instructions constituting the microprograms to be sequentially read.

In FIG. 1, reference numeral 17 indicates a command fetch unit to fetch a command generated by the master processor 1. The micro address decoder 16 is supplied with an address signal attained by decoding in the command decoder 18 the operation code of the command fetched into the command fetch unit 17. The micro address decoder 16 decodes the address signal to read from the micro ROM 15 the first micro instruction of a series of micro instructions to execute the command. The micro instruction thus read is supplied to the micro instruction decoder 19 and is then decoded therein. As a result, the micro instruction decoder 19 supplies to the execution unit 20 and the like the control signals necessary for the execution of the micro instruction.

Each of the second and subsequent micro instructions included in the series of micro instructions corresponding to the macro instruction is indicated when the code of the next address field of the micro instruction previously read is supplied to the command decoder 18. The command decoder 18 includes a multiplexor (not shown) effecting for an output a selection between a macro instruction and a code of the next address field included in a micro instruction. Consequently, based on the code of the next address field thus sequentially selected by the multiplexor, a micro instruction is sequentially read from the micro ROM 15. Operations of the execution unit 20 and the like are controlled according to a predetermined order based on the micro instruction thus read and the control signals corresponding thereto.

Through the operations described above, the coprocessor 2 executes a command, such as for a data transfer or an arithmetic operation supplied from the master processor 1. The master processor 1 executes the control of the bus access cycle necessary for the operation.

Figure 2:
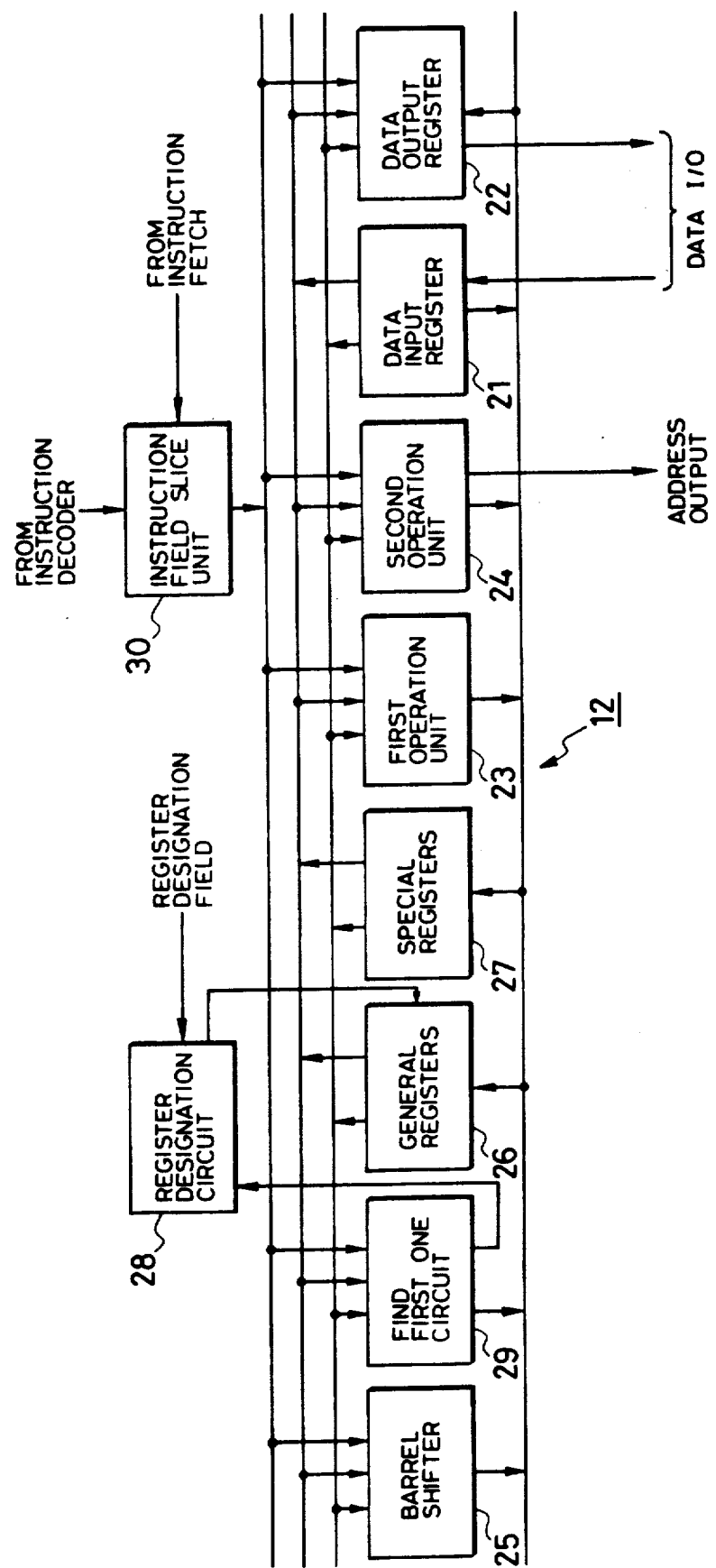
FIG. 2 is a schematic diagram illustrating an example of the execution unit included in the master processor.

The execution unit 12 included in the master processor 1 is configured, for example, as shown in FIG. 2. Namely, four internal buses linked to a data input register 21 and to a data output register 22 connected to the input unit 13 are linked to a first operation unit 23, a second operation unit 24 dedicated to address calculation, a barrel shifter 25, a group of general-purpose registers 26 including a plurality of temporary registers, and a group of special registers 27 including a program counter, a status register, and a stack pointer.

The group of general-purpose registers 26 is subjected to register designation by a register designation circuit 28. The register designation circuit 28 produces two kinds of register designations. The first specification method is carried out on the basis of information contained in a register designation field included in an instruction; whereas, the second specification method is carried out on the basis of an output from the find first one circuit 29 (which could also be referred to as a "fine first set bit circuit" by virtue of its operation to locate a set bit from a plurality of bits), which decodes a register list comprising information to designate a plurality of general-purpose registers. Details of the register list and the find first one circuit 29 will be described later.

In FIG. 2, reference numeral 30 indicates an instruction field slice unit. When an instruction fetched into the instruction fetch unit is an instruction for the coprocessor 2, the instruction field slice unit 30 slices predetermined fields from the pertinent instruction to generate a command for the coprocessor 2. Moreover, the immediate data and memory address designation information contained in the instruction and the register list are sliced and are supplied to the first operation unit 23, the second operation unit 24, the find first one circuit 29, and so forth. In addition, information regarding the size of data to be transferred or to be subjected to the operation and the information regarding the data read/write operation are supplied via the instruction decoder 10.

Figure 3:
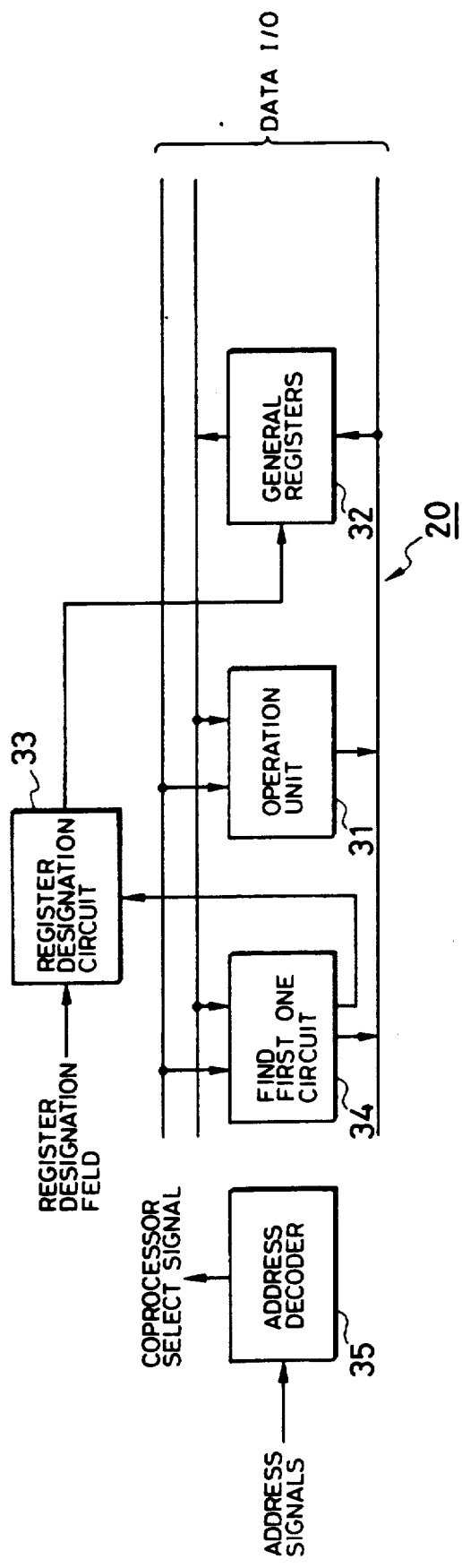
FIG. 3 is a schematic diagram showing an example of the execution unit included in the coprocessor.

The execution unit 20 included in the coprocessor 2 may have a configuration as shown in FIG. 3. Namely, the three buses connected to the input/output unit 14 are linked to a group of general-purpose registers 32 including a plurality of temporary registers. Register designation for the group of general-purpose registers 32 is effected by a register designation circuit 33. The register designation methods in the register designation circuit 33 includes two methods, namely, a designation based on information of the register designation field contained in a command supplied from the master processor and a designation based on an output from the find first one circuit 34 (which could also be referred to as a "find first set bit circuit" by virtue of its operation to locate a set bit from a plurality of bits) decoding the register list which is an information for designating a plurality of registers. Details about the find first one circuit 34 will also be described later. Incidentally, although not shown, the execution unit 20 also is provided with a slice unit to slice a command field, various control registers, and the like.

The master processor 1 achieves an operation selection for the coprocessor 2 according to a selected signal outputted from an address decoder 35 (FIG. 3) receiving an address signal assigned to the coprocessor 2 from the master processor 1 when the master processor 1 fetches an instruction for the coprocessor 2. When the operation is selected, the coprocessor 2 fetches a command supplied from the master processor 1 and is controlled to be in a state in which the pertinent command can be executed.

A description will be given here of a data transfer operation in which the coprocessor 2 performs input/output operations according to the bus access cycle activated by the master processor 1.

Although not essential, the data transfer operation in this example includes five steps, as follows:

(1) The coprocessor 2 receives a command and an instruction address from the master processor 1.

(2) The coprocessor 2 receives data other than the command and the instruction address from the master processor 1.

(3) The coprocessor 2 transfers data to the master processor 1.

(4) The coprocessor 2 writes data in the memory 6.

(5) The coprocessor 2 receives data from the memory 6.

For the data transfer at each step described above, as shown in FIG. 1, an address signal ADRS, an address strobe signal AS indicating the output determination of the address signal ADRS, and a read/write signal R/W indicating the direction of the data transfer are delivered from the master processor 1. That is, at various data transfers, the master processor 1 activates and controls the bus access cycle. When initiating a bus access cycle, the master processor 1 outputs an access type signal AT to enable an identification that the transfer objective of the pertinent operation is a command, an instruction address, or other data. The data DATA as the transfer objective is communicated between the master processor 1, the coprocessor 2, and the memory 6 according to the execution contents of the instruction and the command in the master processor 1 and the coprocessor 2. Incidentally, the instruction address described above is an address of a macro instruction corresponding to a command to be executed by the coprocessor. Since a pipeline processing is executed, the master processor 1 cannot keep the instruction address itself corresponding to the command issued to the coprocessor 2. Due to the provision that the coprocessor 2 keeps the instruction address, the post processing and the exception processing required upon occurrence of an error during a command execution can be smoothly executed.

For a data transfer, as shown in FIG. 1, an acknowledge signal ACK indicating that a data transfer is completed is communicated. The acknowledge signal ACK is outputted from the coprocessor 2 in the transfer steps (1)–(3) above and is recognized by the master processor 1. On detecting an acknowledge signal ACK at the active level (a level indicating the transfer completion), the master processor 1 terminates the pertinent data transfer cycle. Moreover, in the data transfer steps (4)–(5) above, the memory 6 outputs an acknowledge signal ACK, which is then recognized by both the master processor 1 and the coprocessor 2. In this case, on detecting an acknowledge signal ACK at the active level, the master processor 1 terminates at a predetermined timing the bus access cycle for the data transfer cycle. In addition, on receiving an acknowledge signal ACK at the active level, the coprocessor 2 terminates at a predetermined timing the operation for the data transfer cycle. Particularly, in the case of the data transfer step (5) above, when an acknowledge signal ACK at the active level is detected, the coprocessor 2 fetches therein the data read from the memory 6.

Although not essential, the master processor 1 and the coprocessor 2 may be designed to synchronously operate according to the same clock signal. In the synchronous operation, consideration has been given to a provision that the coprocessor 2 can output the necessary data at a timing associated with the bus access cycle controlled by the master processor 1; in other words, in the write cycle for which the coprocessor 2 is the data transfer source, the coprocessor 2 can output the necessary data at the same timing as that of the write cycle for which the master processor 1 is the data transfer source. As shown in FIG. 1, the master processor 1 supplies a coprocessor data enable signal CDE to the coprocessor 2, thereby indicating the start point of the write cycle for which the coprocessor 2 is the data transfer source. In a case where the coprocessor 2 judges the start point of the write cycle by use of an address strobe signal AS and the read/write signal R/W, the coprocessor 2 can substantially initiate an operation to be judge whether the cycle is the write cycle or not only after the transfer destination address is determined on the bus, which delays an output timing for the necessary data.

The status interface between the master processor 1 and the coprocessor 2 is provided by a coprocessor status CPST. The coprocessor status CPST indicates four kinds of status, namely, a command accept status representing a command acceptance by the coprocessor 2, a busy status indicating that a command is in execution by the coprocessor 2, a data ready status meaning that the data size and type of data to be transferred have been completely converted by the coprocessor 2, and an error occurrence status indicating that an error such as a data overflow has occurred during a command execution.

Although the coprocessor system of this embodiment executes various instructions, such as a data transfer instruction, an arithmetic instruction, and a branch instruction, the following description relates to instructions associated with the register list directly related to the present invention.

Figure 4:
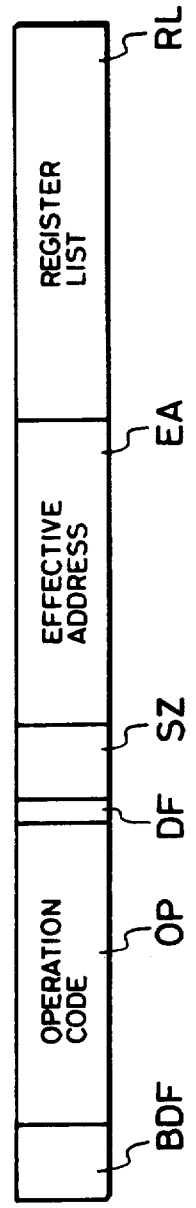
FIG. 4 is a schematic drawing showing an example of the format of data transfer instruction to be fetched by the master processor substantially for the coprocessor.

The instruction format shown in FIG. 4 is an example of the format of a data transfer instruction to be substantially executed by the coprocessor 2. This instruction operates to effect a data transfer between a plurality of general-purpose registers in the coprocessor 2 designated by the register list and the memory 6. The pertinent instruction includes an instruction belonging designation field BDF, an operation code designation field OP for which an operation code indicating the content of operation is designated, a size designation field SZ to designate the data size of the source operand, a direction field DF to designate a read operation or a write operation, an address designation field EA to designate the first address of the memory to be used as the source or the destination, and a register list RL to designate a plurality of general-purpose registers to be used for the data transfer with the memory.

The register list RL comprises a 1-word field of which the bits are respectively assigned to 16 general-purpose registers included in the group of general-purpose registers, and when a predetermined bit of the field is "1", the general-purpose register corresponding to that bit is designated.

When the instruction shown in FIG. 4 is fetched by the master processor 1 and is detected to be a data transfer instruction to be substantially executed by the coprocessor 2 based on the decode result of the instruction belonging designation field BDF, the instruction field slice unit 30 slices a predetermined instruction field shown in FIG. 4 so as to generate a command for the coprocessor 2. The command may have a format as shown in FIG. 5 which comprises the operation code designation field OP, the size designation field SZ, and the register list RL.

In the master processor 1, the register list RL sliced out from the instruction of FIG. 4 is set to the find first one circuit 29 (see FIG. 2). In addition, the register list RL included in the command of FIG. 5 to be transferred to the coprocessor 2 is sliced in the coprocessor 2 and is set to the find first one circuit 34.

Figure 8:
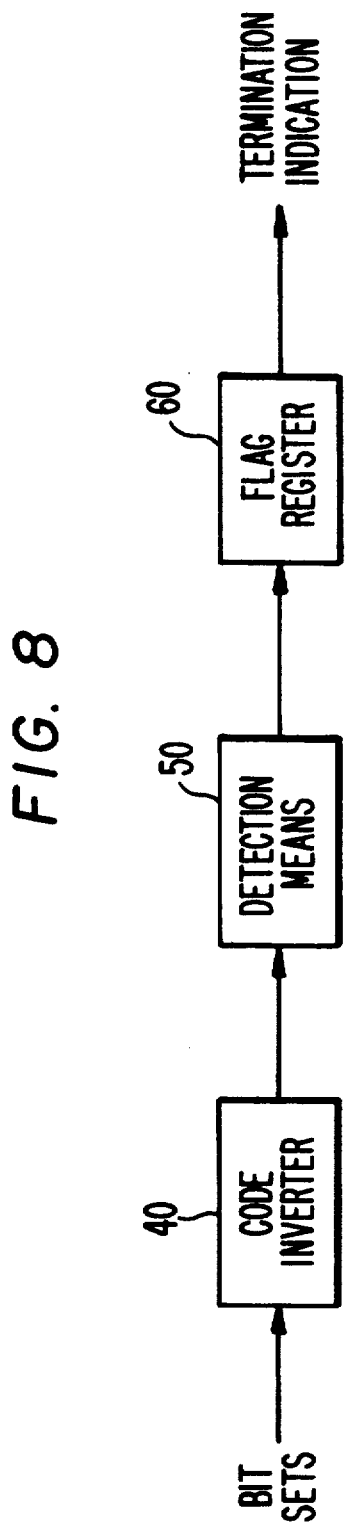

Referring to FIGS. 2, 3 and 8, the find first one circuits 29 and 34 sequentially supply the register designation circuits 28 and 33 with data corresponding to the register numbers respectively designated by the respective register lists RL for each data transfer cycle so as to control the register designation operations and further monitor the number of a sequence of data transfers to all general-purpose registers designated by the respective register lists RL or the completion of a sequence of data transfer operations. More specifically, the position of the upper-most bit in the register lists RL to which "1" has been set is detected and information corresponding to the number of the registers associated with the detected position is respectively supplied to the register designation circuits 28 and 33. Furthermore, at a timing after an execution of the input/output operation of the data, the register lists RL are updated by changing the bit "1" previously detected to be "0" by the code inverter 40. This makes it possible to designate the general-purpose register to be subjected to the subsequent data transfer. Moreover, in order to monitor the number of a sequence of data transfers to all general-purpose registers designated by the respective register lists RL or the completion of a sequence of data transfer operations, it is detected by the detection means 50 whether or not all bits constituting the register lists RL are "0". When a condition that all bits of the register lists RL are "0" is detected respectively by the find first one circuits 29 and 34, flag registers 60 are set, which causes the master processor 1 and the coprocessor 2 to independently terminate the sequence of data transfer instructions and command executions. That is, the master processor 1, based on the output from the find first one circuit 29 included therein, interrupts the update processing of a sequence of operand address for the coprocessor 2 and thereby terminates the processing to activate the bus access cycle. The coprocessor 2, based on the output from the find first one circuit 34 included therein, supplies the master processor 1 by means of the coprocessor status CPST with a status indicating that the command can be executed.

Figure 5:
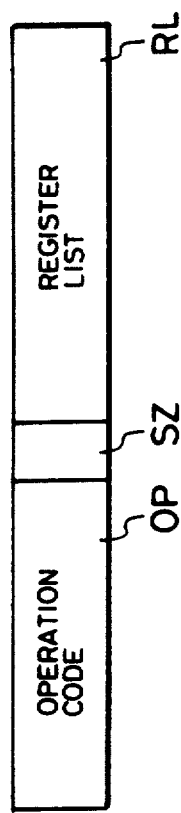
FIG. 5 is a schematic drawing depicting an example of the format of a command to be generated by the master processor for the coprocessor.
Figure 6:
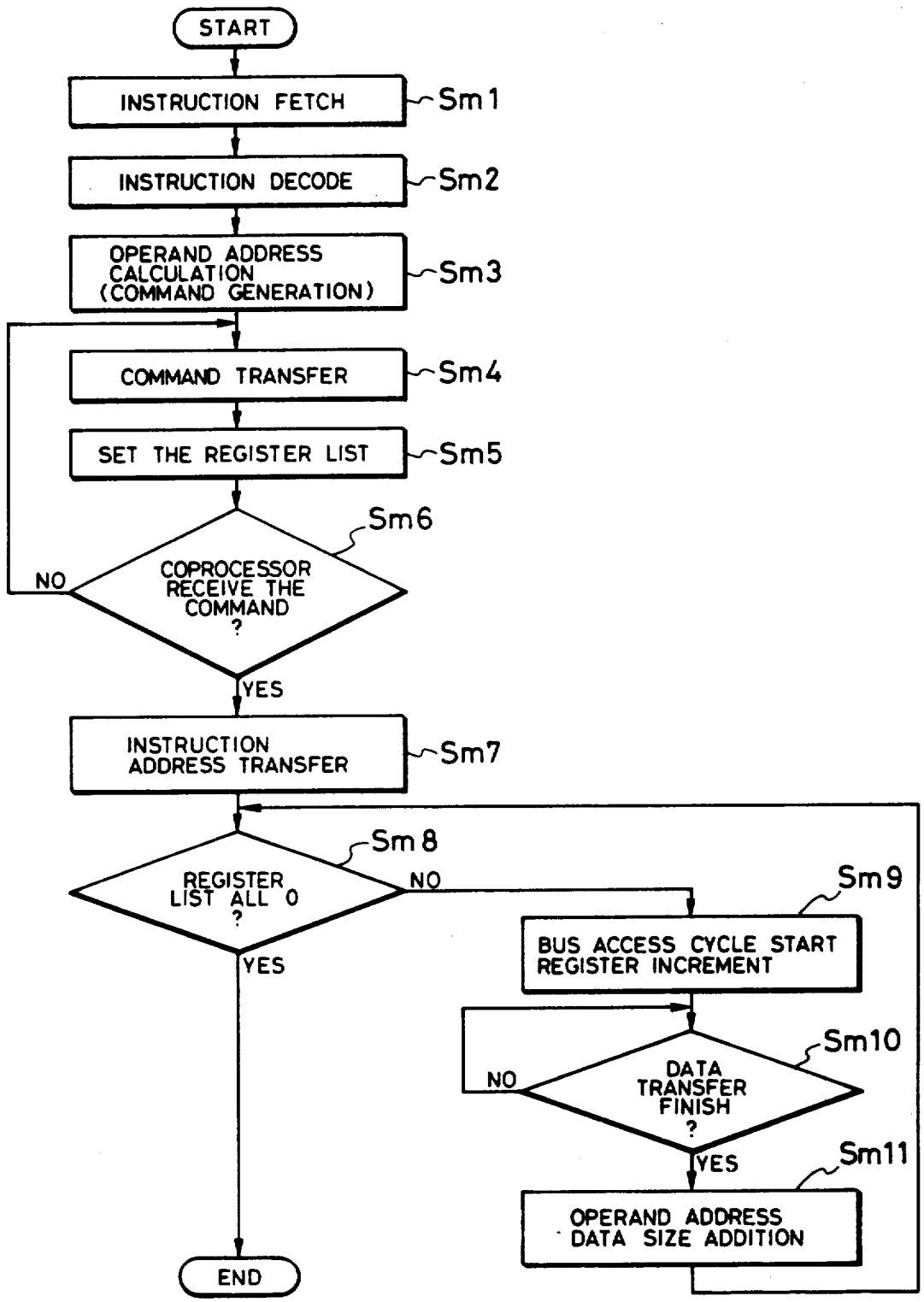
FIG. 6 is a flowchart useful for explaining the operations of the master processor for the data transfer.
Figure 7:
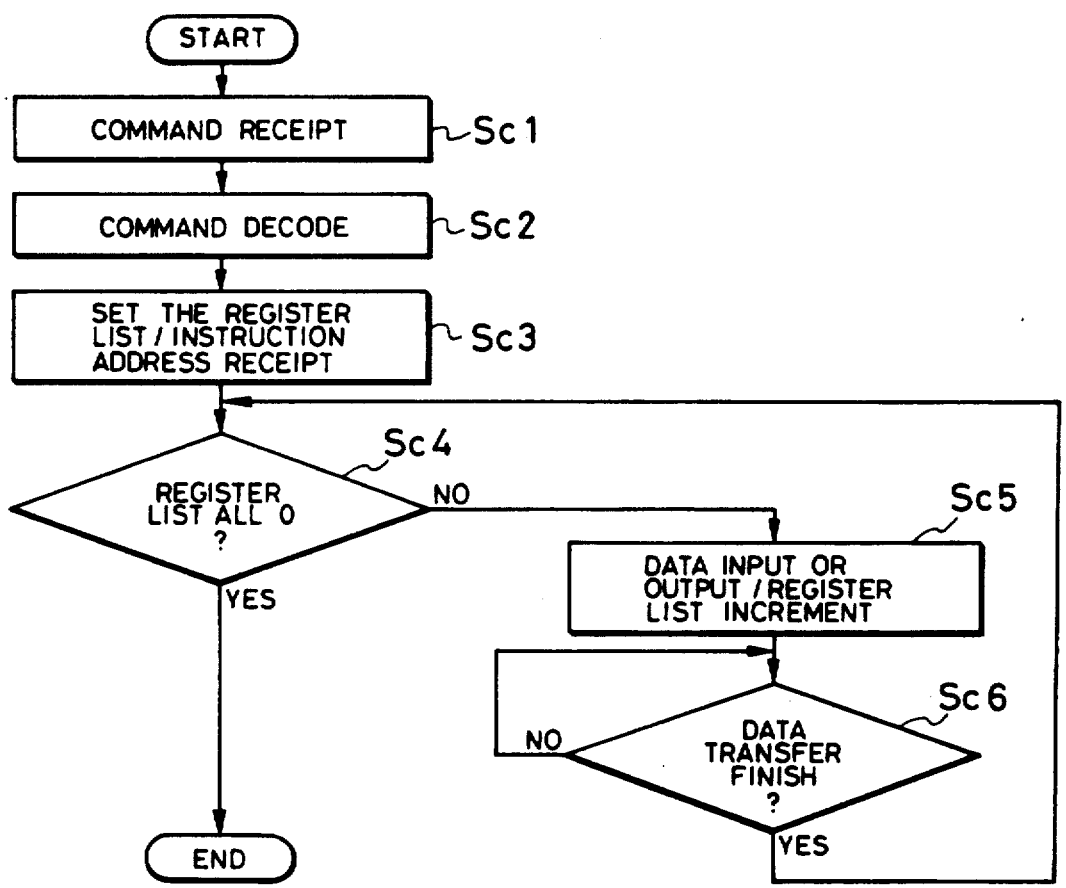
FIG. 7 is a flowchart useful for explaining the operations of the coprocessor in the data transfer and FIG. 8 is a schematic diagram illustrating an example of the find first one circuits of FIGS. 2 and 3.

Next, referring now to FIGS. 6-7, a detailed description will be further given of the operation sequences for the master processor 1 and the coprocessor 2 to effect processing as classified into the data transfer steps (4) and (5) based on the instruction of FIG. 4 and the command of FIG. 5. FIG. 6 shows the operation sequence of the master processor 1, whereas FIG. 7 illustrates the operation sequence of the coprocessor 2.

When the data transfer instruction shown in FIG. 4 is fetched by the master processor 1, the master processor 1 decodes by means of the instruction decoder the information of the instruction belonging designation field and the operation code included in the instruction code (step Sm2). As a result, the master processor 1 recognizes that the pertinent instruction is an instruction to be substantially executed by the coprocessor 2 and then sequentially reads the micro instructions from the micro ROM 7, thereby executing an operation sequence corresponding to the operation code.

That is, based on the information of the address designation field EA included in the data transfer instruction, the first operand address (an address in the memory 6) is calculated for the data transfer and the instruction field slice unit 30 generates a command for the coprocessor 2 (step Sm3). This command has a command having the format shown in FIG. 5.

Next, the command is transferred to the coprocessor 2 (step Sm4) and the register list RL sliced by the instruction field slice unit 30 is set to the find first one circuit 29 (step Sm5); and thereafter, the transfer result of the command is judged by use of the busy flag and the like included in the coprocessor status (step Sm6). Then the steps Sm4, Sm5, and Sm6 are repeatedly effected until the reception of the command is completed.

When the completion of the command reception by the coprocessor 2 is judged in the step Sm6, the address of the pertinent instruction is then transferred from the master processor 1 to the coprocessor 2 (step Sm7).

Referring to FIG. 7, in the coprocessor 2, when the command transferred in the step Sm4 of the master processor 1 is received by the command fetch unit 17 in synchronism with the transfer timing (step Sc1), the coprocessor 2 decodes by means of the command decoder 18 the operation code included in the command (step Sc2). This causes the coprocessor 2 to sequentially read the micro instructions from the micro ROM 15 and then execute the operation sequence depending on the operation code. First, the instruction address transferred in the step Sm7 of the master processor 1 is received by the coprocessor 2 in synchronism with the transfer timing and then the register list RL sliced from the command in the coprocessor 2 is set to the find first one circuit 34 (step Sc3).

After the operation described above, the master processor 1 judges whether or not all bits of the regular list. RL set to the find first one circuit 29 are "0" (step Sm8). If this is not the case, the bus access cycle is generated and controlled for the operand transfer by the coprocessor 2 and then the register list RL is updated in the find first one circuit 29 (step Sm9). The generation and control of the bus access cycle for the operand transfer by the coprocessor 2 include such operations as an output of the operand address calculated in the step Sm3, an output of the address strobe signal AS corresponding to the determination of the pertinent address signal on the bus, and an output of the read/write signal R/W. The find first one circuit 29 included in the master processor 1 dedicatedly monitors whether or not all bits of the register list RL are "0", namely, whether or not a sequence of data transfers following the pertinent instruction has been completely executed. This find first one circuit 29 does not effect the control operation to designate general purpose registers. The decode result of the find first one circuit 29 is not supplied to the register designation circuit 28.

In this situation, like the master processor 1, the coprocessor 2 judges whether or not all bits of the register list RL set to the find first one circuit 34 are "0" (step Sc4). If this is not the case, the input/output control of the operand is achieved according to the bus access cycles activated by the master processor 1; thereafter, the register list RL is updated in the find first one circuit 34 (step Sc5). During the input/output control of the operand by the coprocessor 2, the find first one circuit 34 detects the position of the upper-most bit in the register list RL to which "1" has been set and then supplies the designation circuit 33 with information corresponding to the number of the register associated with the detection position, thereby controlling the operation in the coprocessor 2 to designate registers to output or to input the operand. In this case, if the operand transfer operation is a write operation, in other words, if the coprocessor 2 writes data in the memory, the data output timing of the coprocessor 2 is supplied by a coprocessor data enable signal CDE outputted from the master processor 1.

The master processor 1, after the generation of the bus access cycle, judges whether or not the data transfer operation has been completed in the pertinent cycle based on the acknowledge signal ACK (meaning that the data has been read from or written in the memory 6) outputted from the memory 6 (step Sm10). If the completion of the data transfer operation is judged, the data size is added to the operand address (step Sm11) to prepare for the next activation of the bus access cycle. On the other hand, based on the acknowledge signal ACK outputted from the memory 6, the coprocessor 2 determines whether or not the data transfer operation in the pertinent data cycle has been completed (step Sc6). In a case where the coprocessor 2 fetches the data transferred from the memory 6 (for a data write operation), the pertinent transfer data is fetched into a predetermined general-purpose register designated by the find first one circuit 34 based on the acknowledge signal ACK.

The master processor 1 returns from the step Sm11 to the step Sm8 so as to judge whether or not all bits of the updated register list RL are "0". In other words, the master processor 1 judges whether or not there remain data transfer elements of the coprocessor 2, namely, whether or not it is further required to activate a bus access cycle for the coprocessor 2. The coprocessor 2 returns from the step Sc6 to the step Sc4 to judge whether or not all bits of the updated register list RL are "0". If this is not the case, the register list RL is used to designate general-purpose registers for the next data transfer.

As described above, the master processor 1 and the coprocessor 2 independently judge the remaining items of the data transfer elements. If it has been judged that another data transfer is necessary, the master processor 1 activates the bus access cycle in the same fashion as described above and the coprocessor 2 effects the communication of data according to the bus access cycle thus activated.

If it has been judged by both the master processor 1 and the coprocessor 2 that all bits of the respective register lists RL are "0", the execution of the instruction and command is terminated without achieving the intercommunication of the information therebetween.

According to the description above, the following effects can be attained.

(1) When the coprocessor communicates a sequence of plural data items with the master processor and the memory according to the bus access cycle activated by the master processor, the coprocessor is supplied with information indicating the data storage position as the data transfer source or the data transfer destination; furthermore, the master processor and the coprocessor independently monitor the number of the sequence of data transfers or the completion of the sequence of data transfer operations. As a consequence, when the coprocessor executes a sequence of plural data transfer operations, it is not necessary for the coprocessor to receive a command from the master processor each time a data item is transferred; therefore, in a case where the master processor generates and controls the bus access cycle on the one hand, and the coprocessor effects the actual data communication on the other hand, there is obtained an effect which prevents the reduction of the data transfer efficiency due to the increase of the number of commands issued, which may occur when the number of the sequence of data transfers is recognized only by the master processor for the control thereof.

(2) Furthermore, in the case above, since the coprocessor need not indicate the end of the sequence of data transfer cycle to the master processor, the signal to indicate the end of the sequence of data transfer cycles to the master processor is not undesirably delayed, which may occur when only the coprocessor recognizes and controls the number of the sequence of data transfers; as a result, the next operation required to be started after the sequence of the data transfer operations can be immediately effected.

(3) According to the effects of (1) and (2) above, there is obtained an effect that the operation efficiency of the overall coprocessor system can be improved.

Although the invention has been described based on an exemplary embodiment, the present invention is not restricted by the disclosed embodiment and it is to be appreciated that various changes and modifications thereof are possible without departing from the scope and spirit of the invention.

For example, although the find first one circuits 29 and 34 also effecting the control of the register designation circuit have been adopted as means to monitor the number of data transfers or the completion of the sequence of data transfer operations, such means can be modified to have a configuration in which the number of data transfers is counted and a condition that a point at which the count value reaches a predetermined value is detected. Moreover, the means may also effect the control of the register designation circuit.

In addition, the information indicating a plurality of data transfer sources and destinations is not restricted by the register list in the form described in conjunction with the embodiment, namely, the information may be in a form to directly designate a plurality of register numbers. In this case, data indicating the number of necessary data transfers is separately required; however, such data may be supplied as an operand without containing the data in an instruction or a command.

Furthermore, although description has been given of an example of the data transfer instruction between the memory and the coprocessor, the present invention is also applicable to a case of a transfer of a command and other data between the master processor and the coprocessor and further to an execution of an arithmetic instruction substantially requiring a transfer of an operand.

Although the description above has been given of a case where the invention primarily made by the present invention is applied to data transfer control between a plurality of general-purpose registers in the coprocessor and the memory which is the utilization field as the background of the present invention, the present invention is not restricted by this case, but it can be widely applied to the data transfer control in a case in which other data storage means, such as a peripheral unit other than the memory and control registers in the coprocessor are used. In short, the present invention is applicable to a condition where at least a master processor and a coprocessor are included.

While the present invention has been described with reference to the particular illustrative embodiment, it is not restricted by the embodiment but only the appended claims. It is appreciated that those skilled in the art can change and modify the embodiment without departing from the scope and spirit of the invention.

What is claimed is:

1. A microprocessor system comprising:
a bus;
a coprocessor coupled to said bus; and
a master processor coupled to said bus for executing a bus access cycle for said coprocessor; and
an external device coupled to said bus,
said coprocessor including first judge means for judging a completion of a sequence of data transfer operations effected between an internal section of said coprocessor and said external device with respect thereto; and
said master processor including second judge means for judging a completion of said sequence of data transfer operations independently of said first judge means, wherein said second judge means effects said judging of the completion of said sequence of data transfer operations, in said second judging means, based on a count of said data transfer operations, wherein said first judge means and said second judge means each are find first set bit circuits respectively disposed in said coprocessor and said master processor,
each said find first set bit circuit including means for effecting for each data transfer operation a code inversion on a predetermined code bit included in a plurality of bit sets of data transferred in said each data transfer operation, which bit sets are applied to each said find first set bit circuit so as to update said data of said plurality of bit sets, and means for effecting a judgement of a completion of operations for said each data transfer operation based on a condition that said updated data transferred in said each data transfer operation does not include said predetermined code bit.

2. A microprocessor system according to claim 1, wherein said data of said plurality of bit sets of data transferred in said each data transfer operation designates, based on a combination of each bit code, a predetermined one of a plurality of internal data storage means possessed by said coprocessor.

3. A microprocessor system according to claim 2, wherein each of said find first set bit circuits includes means for deciding data of a plurality of bit sets thereto for controlling a designation of said internal data storage means of said coprocessor.

4. A microprocessor system according to claim 3, wherein said data of said plurality of bit sets of data transferred in said each data transfer operation is contained in an instruction to be fetched by said master processor for said coprocessor.

5. A microprocessor system according to claim 4, wherein said master processor includes means for slicing an instruction to be fetched from said master processor for said coprocessor and for generating a command for said coprocessor,
said command containing said data of said plurality of bit sets of data transferred in said each data transfer operation.

6. A microprocessor system according to claim 2, wherein said plurality of internal data storage means include a plurality of general-purpose registers.

7. A microprocessor system according to claim 1, wherein said internal section includes a plurality of data storage means for storing data and wherein said plurality of bit sets designate a predetermined one of said plurality of data storage means.

8. A microprocessor system according to claim 7, wherein each of said find first set bit circuits includes means for deciding said plurality of bit sets to designate one of said data storage means of said coprocessor.

9. A microprocessor system according to claim 8, wherein said plurality of bit sets is included in an instruction to be fetched by said master processor for said coprocessor.

10. A microprocessor system according to claim 9, wherein said master processor includes means for forming a command to be provided to said coprocessor, on the basis of said instruction fetched by said master processor, said command including a plurality of bit sets to be set into the find first set bit circuit of said coprocessor.

11. A microprocessor system according to claim 7, wherein said plurality of data storage means include a plurality of general-purpose registers.

12. In a microprocessor which includes steps for an operation effected by a coprocessor coupled to a bus to communicate a sequence of plural data between an external device coupled to said bus and a plurality of data storage means included in said coprocessor according to a bus access cycle activated by a master processor coupled to said bus, said steps including:

a fetch step to be used by said master processor to fetch a predetermined instruction from said master processor for said coprocessor;

a command step following said fetch step to be used by said master processor to generate a command for said coprocessor based on said instruction fetched in said fetch step; and a step following said command step to be used by said master processor to supply said command generated in said command step to said coprocessor, wherein said master processor further includes means of effecting a step for monitoring an end of a sequence of data transfer operations based on data contained in said instruction, and wherein said coprocessor includes means for effecting a step for monitoring an end of a sequence of data transfer operations based on said information contained in said command independently of said monitoring step carried out by said master processor, and a step operative based on said data contained in said command for judging and for designating for each data transfer cycle a data storage position used as a data transfer source or destination in said coprocessor, wherein said step for judging and for designating for each data transfer cycle a data storage position comprises:

effecting for each data transfer operation a code inversion on a predetermined code bit included in a plurality of bit sets of data transferred in said each data transfer operation; and effecting a judgment of a completion of operations for said each data transfer operation based on a condition that said updated data transferred in said each data transfer operation does not include said predetermined code bit.

13. A microprocessor according to claim 12, wherein said data of the plurality of bit sets of data transferred in said each data transfer operation designates, based on a combination of each bit code, a predetermined one of a plurality of internal data storage means possessed by said coprocessor.

14. In a microprocessor system which includes a bus, a master processor coupled to said bus, a coprocessor coupled to said bus and an external device coupled to said bus, a method for executing a sequence of data transfer operations between said external device and a plurality of data storage means included in said coprocessor according to bus access cycles activated by said master processor, via said bus, said method comprising the steps including:

(a) fetching a predetermined instruction from said coprocessor, by said master processor;

(b) generating a command for said coprocessor based on said instruction fetched in said fetch step (a), by said master processor; and (c) providing said command generated in said command step to said coprocessor, wherein said master processor includes means for effecting a step for monitoring an end of said sequence of said data transfer operations based on data included in said instruction, and wherein said coprocessor includes means for effecting a step for monitoring an end of said sequence of said data transfer operation based on data included in said command independently of the monitoring carried out by said master processor.

15. A method according to claim 14, wherein the monitoring to be effected by said master processor includes a step for stopping an activation of a further bus access cycle after a detection of said end of the sequence of data transfer operations.

16. A method according to claim 15, wherein said monitoring by said coprocessor includes a step for stopping an input or output operation of data after a detection of said end of said sequence of data transfer operations.

17. A method according to claim 14, wherein the monitoring by said coprocessor includes a step for stopping an activation of a further bus access cycle after a detection of said end of said sequence of data transfer operations.

18. A method according to claim 14, further including a step operative based on said data included in said command for judging and for designating, for each data transfer cycle, data storage means used as a data transfer source or destination in said coprocessor.

19. A method according to claim 18, wherein said step for judging and for designating for each data transfer cycle the data storage means comprises:

effecting for each data transfer operation a code inversion on a predetermined code bit included in said data; and effecting a judgment of a completion of operations for said each data transfer operation based on a condition that said data do not include said predetermined code bit.

20. A method according to claim 19, wherein the plurality of bits included in said data indicate, based on a combination of each bit code, a predetermined one of the data storage means included in said coprocessor.

21. A microprocessor system comprising:

a bus;

a coprocessor coupled to said bus;

a master processor coupled to said bus for executing a bus access cycle for said coprocessor; and an external device coupled to said bus, wherein said coprocessor includes a first find set bit means for judging a completion of a sequence of data transfer operations effected between a plurality of internal sections of said coprocessor and said external device, wherein said master processor includes second find first set bit means for judging a completion of said sequence of data transfer operations, and wherein each of said first and second find first set bit means includes means in which is set a plurality of information bits for indicating said internal sections, means for updating said set information bits in response to each of said data transfer operations and means for judging the updated information bits to determine whether or not each of said updated set information bits reaches a predetermined state.

22. A microprocessor system according to claim 21, wherein said internal sections include a plurality of registers.

23. A microprocessor system according to claim 22, wherein said updating means includes inversion means for inverting a predetermined information bit of said set information bits in response to one of said data transfer operations.

24. A microprocessor system according to claim 23, wherein said predetermined information bit is a bit for indicating a register, to be transferred with data among said register, in response to said one data transfer operation.

25. A method of data transfer in a microprocessor system which includes a bus, a coprocessor coupled to said bus, a master processor coupled to said bus for executing a bus access cycle for said coprocessor and an external device coupled to said bus, said method comprising:
(a) setting first information bits for indicating internal sections of said coprocessor into first find first set bit means in response to an instruction, wherein said first find first set bit means for judging a completion of a sequence of data transfer operations effected between said internal sections of said coprocessor and said external device is included in said master processor;
(b) setting second information bits for indicating said internal sections of said coprocessor into second find first set bit means in response to a command which is formed on the basis of said instruction, wherein said second find first set bit means for judging a completion of said sequence of data transfer operations effected between said internal sections of said coprocessor and said external device is included in said coprocessor;
(c) updating the set first information bits in response to each of said data transfer operations in said master processor;
(d) updating the set second information bits in response to each of said data transfer operations in said coprocessor;
(e) judging the updated first information bits to determined whether or not each of the updated first information bits reaches a predetermined state to detect said completion of said sequence of data transfer operations in said master processor; and
(f) judging the updated second information bits to determine whether or not each of the updated second information bits reaches a predetermined state to detect said completion of said sequence of data transfer operations in said coprocessor.

26. A method according to claim 25, wherein said internal sections includes a plurality of registers.

27. A method according to claim 26, wherein said updating step (c) includes a step (c1) for inverting a predetermined bit in the set first information bits in response to one of said data transfer operations in said master processor.

28. A method according to claim 27, wherein said updating step (d) includes a step (d1) for inverting a predetermined bit in the set second information bits in response to one of said data transfer operations in said coprocessor.

29. A microcomputer system comprising:
a bus;
a coprocessor coupled to said bus;
a master processor coupled to said bus for executing a bus access cycle for said coprocessor; and
an external device coupled to said bus;
said master processor including:
transfer means for transferring a command to the coprocessor,
calculation means for executing a calculation of an address of the external device for a data transfer operation, and
first set means set with a data transfer number between the coprocessor and the external device included in the command, wherein the master processor includes means for judging completion of the data transfer operation independently of the coprocessor in accordance with the set data transfer number of the first set means,
said coprocessor including:
second set means set with the data transfer number included in the command provided from the master processor, wherein the coprocessor includes means for judging completion of the data transfer operation effected between an internal section of the coprocessor and the external device in accordance with the set data transfer number of the second set means,
wherein the data transfer operation between the coprocessor and the external device is executed through the bus without passing through the master processor.

30. A microprocessor system according to claim 29, wherein each of the first and second set means is a find first set bit circuit,
and wherein said find first set bit circuit includes means for effecting for each data transfer operation a code inversion on a predetermined code bit included in a plurality of bit sets which have been set to the find first set bit circuit so as to update the plurality of bit sets, and means for effecting a judgment of a completion of the sequence of the data transfer operations based on a condition that each of the updated bit sets does not include the predetermined code bit.

31. A microprocessor system according to claim 30, wherein the internal section of the coprocessor includes a plurality of data storage means for storing data, and wherein the plurality of bit sets designate a predetermined one of the plurality of data storage means.

32. A microprocessor system according to claim 31, wherein each of the find first set bit circuits includes means for decoding the plurality of bit sets to designate one of the data storage means of the coprocessor.

33. A microprocessor system according to claim 32, wherein the master processor includes means for forming the command to be provided to the coprocessor, on the basis of the instruction fetched by the master processor,
the command including a plurality of bit sets to be set into the find first set bit circuit of the coprocessor.

34. A microprocessor system according to claim 33, wherein the plurality of data storage means includes a plurality of general purpose registers.

35. A microprocessor system according to claim 34, wherein the external device is memory means for data.

* * * * *